(12) United States Patent
Gupta (10) Patent No.: US 11,640,599 B2
(45) Date of Patent: *May 2, 2023

(54) SMART CARD DEPENDENT TRANSFER TECHNOLOGY

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 191 days.

This patent is subject to a terminal disclaimer.

(21) Appl. No.: 17/060,112

(22) Filed: Oct. 1, 2020

(65) Prior Publication Data

US 2022/0108299 A1 Apr. 7, 2022

(51) Int. Cl.

| G06Q 20/34 | (2012.01) |
|---|---|
| G06Q 20/02 | (2012.01) |
| G06Q 20/42 | (2012.01) |
| G06Q 20/40 | (2012.01) |
| G06Q 40/02 | (2023.01) |

(Continued)

(52) U.S. Cl.
CPC ....... *G06Q 20/341* (2013.01); *G06K 19/0702* (2013.01); *G06Q 20/027* (2013.01); *G06Q 20/108* (2013.01); *G06Q 20/352* (2013.01); *G06Q 20/4012* (2013.01); *G06Q 20/40145* (2013.01); *G06Q 20/42* (2013.01); *G06Q 40/02* (2013.01); *G06F 3/0488* (2013.01); *G06F 3/04842* (2013.01); *G06Q 2220/00* (2013.01)

(58) Field of Classification Search
CPC .. G06Q 20/341; G06Q 20/027; G06Q 20/352; G06Q 20/4012; G06Q 20/40145; G06Q 20/42; G06Q 2220/00; G06K 19/0702; G06F 3/04842; G06F 3/0488
See application file for complete search history.

(56) References Cited

U.S. PATENT DOCUMENTS

| 6,687,350 B1 * | 2/2004 | Landry | G07F 7/0886 |
|---|---|---|---|
| | | | 379/144.04 |
| 7,083,087 B1 * | 8/2006 | Gangi | G06Q 20/341 |
| | | | 235/379 |

(Continued)

OTHER PUBLICATIONS

Smartcard Reader for Smartphone e-Commerce Applications (Year: 2018).*

*Primary Examiner* — Mamon Obeid
(74) *Attorney, Agent, or Firm* — Weiss & Arons LLP (57) ABSTRACT

Apparatus and methods are provided for a smart card which enables users to securely complete online transfers without entering sensitive transaction information into a third-party system. The smart card may include a touch-sensitive screen configured to display selectable transfer options. The smart card may include a microprocessor and wireless interface. The wireless interface may provide wireless communication capabilities and the ability to initiate online transfers based on information captured by the touch-sensitive screen. The smart card may be a parent smart card associated with a parent account. The parent account may be linked to a dependent account. The parent smart card may receive a communication related to the dependent account. Selectable transfer options displayed on the touch-sensitive screen may enable a transfer from the parent account to the dependent account.

18 Claims, 7 Drawing Sheets

(51) Int. Cl.
*G06Q 20/10* (2012.01)
*G06K 19/07* (2006.01)
*G06F 3/04842* (2022.01)
*G06F 3/0488* (2022.01)

(56) References Cited

U.S. PATENT DOCUMENTS

| | | | | |
|---|---|---|---|---|
| 7,233,926 B2 * | 6/2007 | Durand | G06Q 20/10 | 235/375 |
| 7,303,120 B2 * | 12/2007 | Beenau | G06Q 30/0215 | 340/5.4 |
| 7,314,164 B2 * | 1/2008 | Bonalle | G07C 9/27 | 340/5.4 |
| 7,686,213 B1 * | 3/2010 | Ramachandran | G06Q 20/32 | 235/379 |
| 8,015,085 B2 * | 9/2011 | Blagg | G06Q 20/10 | 705/35 |
| 8,794,535 B2 * | 8/2014 | Marseille | G06K 19/07345 | 235/492 |
| 9,898,781 B1 * | 2/2018 | Silverman | G06Q 20/223 | |
| 10,062,245 B2 * | 8/2018 | Fulker | G06F 3/0482 | |
| 10,366,378 B1 * | 7/2019 | Han | G06Q 20/204 | |
| 10,504,584 B2 * | 12/2019 | Aoyama | G11C 11/418 | |
| 10,616,075 B2 * | 4/2020 | Dawes | G06F 3/0488 | |
| 10,621,574 B1 * | 4/2020 | Rao | G06Q 20/363 | |
| 10,997,592 B1 * | 5/2021 | Kurani | G06Q 20/3821 | |
| 11,003,839 B1 * | 5/2021 | Hatch | G06F 40/166 | |
| 11,068,768 B1 * | 7/2021 | Gupta | G06K 19/0719 | |
| 11,074,489 B1 * | 7/2021 | Gupta | G06K 19/0724 | |
| 11,107,065 B1 * | 8/2021 | Gupta | G06K 19/07707 | |
| 11,113,686 B1 * | 9/2021 | Ellis | G06Q 20/36 | |
| 11,301,554 B2 * | 4/2022 | Law | G06F 21/34 | |
| 11,343,378 B1 * | 5/2022 | Sharma | H04L 65/1069 | |
| 11,354,555 B1 * | 6/2022 | Yee | G06K 19/0709 | |
| 11,392,932 B1 * | 7/2022 | Gupta | G07F 7/0846 | |
| 11,397,942 B2 * | 7/2022 | Gupta | G06Q 20/382 | |
| 11,416,923 B1 * | 8/2022 | Kawan | G07F 7/0866 | |
| 2001/0042785 A1 * | 11/2001 | Walker | G06Q 40/00 | 235/379 |
| 2002/0066784 A1 * | 6/2002 | Segal | G06Q 20/40145 | 235/381 |
| 2002/0082962 A1 * | 6/2002 | Farris | G07F 19/202 | 705/35 |
| 2002/0161641 A1 * | 10/2002 | Quinlan | G06Q 30/0215 | 705/14.35 |
| 2005/0035193 A1 * | 2/2005 | Gustin | G06Q 20/042 | 235/379 |
| 2006/0127623 A1 * | 6/2006 | Ishida | G03H 1/02 | 428/40.1 |
| 2007/0094132 A1 * | 4/2007 | Waterson | G06Q 20/04 | 705/39 |
| 2007/0124810 A1 * | 5/2007 | Sigalow | G06Q 20/40 | 726/9 |
| 2008/0120231 A1 * | 5/2008 | Megwa | G06Q 20/10 | 705/41 |
| 2009/0138398 A1 * | 5/2009 | Cole | G06Q 20/102 | 705/42 |
| 2009/0265272 A1 * | 10/2009 | Dill | G06Q 20/1085 | 705/41 |
| 2009/0272796 A1 * | 11/2009 | Ong | G07F 7/1091 | 235/492 |
| 2009/0289106 A1 * | 11/2009 | Bishop | G06Q 20/20 | 235/379 |
| 2009/0314840 A1 * | 12/2009 | Granucci | G06K 19/07 | 235/492 |
| 2010/0100461 A1 * | 4/2010 | Laing | G06Q 20/40 | 709/204 |
| 2010/0312692 A1 * | 12/2010 | Teicher | G06Q 20/3278 | 455/414.1 |
| 2012/0047007 A1 * | 2/2012 | Halsey | G06Q 20/352 | 705/14.15 |
| 2014/0194195 A1 * | 7/2014 | Warner | G06Q 50/34 | 463/25 |
| 2016/0267486 A1 * | 9/2016 | Mitra | G07F 7/0846 | |
| 2016/0286805 A1 * | 10/2016 | Polson | B27K 3/36 | |
| 2017/0357979 A1 * | 12/2017 | Khurana | H04W 12/08 | |
| 2018/0053180 A1 * | 2/2018 | Cho | G06Q 20/353 | |
| 2019/0019179 A1 * | 1/2019 | Mtaza | G06Q 20/4016 | |
| 2019/0286805 A1 * | 9/2019 | Law | G06F 21/34 | |
| 2020/0126353 A1 * | 4/2020 | Ovalle | G07F 17/3237 | |
| 2020/0311719 A1 * | 10/2020 | Liu | G06Q 20/353 | |
| 2021/0383338 A1 * | 12/2021 | Gupta | G06Q 10/10 | |
| 2021/0383359 A1 * | 12/2021 | Gupta | G06Q 20/352 | |
| 2022/0108287 A1 * | 4/2022 | Gupta | G06Q 20/227 | |
| 2022/0108299 A1 * | 4/2022 | Gupta | G06K 19/0702 | |
| 2022/0180357 A1 * | 6/2022 | Chattopadhyay | G06Q 20/351 | |

* cited by examiner

SMART CARD DEPENDENT TRANSFER TECHNOLOGY

FIELD OF TECHNOLOGY

Aspects of the disclosure relate to a smart payment card with enhanced communication features.

BACKGROUND OF THE DISCLOSURE

When conducting online transactions and payments, users typically enter credit card information or other sensitive transaction information into a web browser or mobile application. However, doing so increases a risk that the sensitive transaction information will be exposed. For example, security associated with the web browser may be substandard or the security of another network system utilized by a mobile application may be compromised. These potential security flaws associated with third-party systems that transmit and capture sensitive transaction information may increase the exposure risk.

In addition to security breaches of even reputable third-party systems, there are unscrupulous actors who design systems which attempt to induce users to enter sensitive transaction information into legitimate-looking webpages. These rogue systems are typically designed to masquerade as a reputable system or webpage, and thereby induce the user to enter sensitive transaction information. The system may then expose the captured sensitive transaction information for self-serving pecuniary gain.

Recently, use of digital wallets has proliferated. These digital wallets are typically associated with more reliable security than prior systems. However, even use of a digital wallet does not fully address the challenges in securing sensitive transaction information. For example, when using digital wallets, sensitive transaction information may still be captured using third-party applications that may track use and content of the sensitive transaction information. By increasing the number of parties that handle the sensitive transaction information, there is an associated increase in risk that the sensitive transaction information will be inadvertently disclosed.

It would be desirable to provide more secure apparatus and methods for users to carry out online transactions without providing sensitive transaction information to any third-party system.

In addition to reducing the exposure risk of sensitive transaction information, such apparatus and methods may improve user experience by enabling direct transactions between card users. It would be desirable to enable a card user to receive account alerts regarding a dependent account pre-associated with the user card. It would be desirable to enable a transfer of funds to the dependent account directly from the user card, without providing sensitive transaction information to any third-party system.

SUMMARY OF THE DISCLOSURE

A smart payment card may enable direct online transfers and improve the security of sensitive transaction information. The smart payment card may include a housing. A wireless communication interface, a microprocessor, and a battery for powering the communication interface and the microprocessor may be embedded in the housing. The smart card may include a touch-sensitive screen that captures finger motions.

The smart payment card may include executable instructions stored in a non-transitory memory. The executable instructions, when run by the microprocessor may display a selectable transfer option using the touch-sensitive screen. The executable instructions may capture a touch-based selection of the transfer option using the touch-sensitive screen, and based on the captured selection, formulate a set of transfer instructions. The transfer may be a transfer between a parent smart card account and a dependent smart card account.

The executable instructions may, using the wireless interface, establish a direct communication channel with a secure payment gateway identified in the transfer instructions and transmit the transfer instructions directly to the secure payment gateway for processing.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Apparatus for a system that improves transmission security of sensitive transaction information for online transfers is provided. The system may include a smart card. A smart card may be a payment (e.g., debit or credit) card that includes embedded integrated circuitry. The integrated circuitry may be configured to store sensitive transaction information. The integrated circuitry may also be configured to execute machine readable instructions that control operation of other components of the smart card.

The smart card may include hardware and associated integrated circuitry for users to complete online transfers without entering sensitive transaction information into a third-party system such as a web browser or other software applications. The smart card may include a touch-sensitive screen. The smart card may include a virtual keypad. The user may use the touch-sensitive screen to enter information directly into the smart card.

The smart card may include a microprocessor and a Network Interface Card ("NIC"). The microprocessor and associated NIC may enable the smart card to establish a communication channel. Over the secure communication channel, the smart card may interact directly with a secure system for transferring funds. The secure system may be operated by an issuer or acquirer of the smart card. The microprocessor may have a thickness that is not greater than 0.25 millimeters ("mm"). The microprocessor may control overall operation of the smart card and its associated components.

The smart card may include various other hardware components. Such components may include a battery, a speaker, and antenna(s). The smart card may include RAM, ROM, an input/output ("I/O") module and a non-transitory or non-volatile memory.

The I/O module may include a microphone which may accept user provided input. The I/O module may include one or more of a speaker for providing audio output and a display for providing textual, audiovisual and/or graphical output.

Software may be stored within the non-transitory memory and/or other storage media. Software may provide instructions, that when executed by the microprocessor, enable the smart card to perform various functions. For example, software may include an operating system, application programs, web browser and a database. Alternatively, some or all of computer executable instructions of the smart card may be embodied in hardware or firmware components of the smart card.

Application programs, which may be used by the smart card, may include computer-executable instructions for invoking user functionality related to communication, authentication services, and voice input and speech recognition applications. Application programs may utilize one or more algorithms that encrypt information, process received executable instructions, interact with an issuer or acquirer bank systems, perform power management routines or other suitable tasks.

The smart card may include a pressure sensitive button. The pressure sensitive button may have a thickness that is not greater than 0.8 mm. A user may actuate the pressure sensitive button to power on or off one or more components of the smart card. For example, actuating the pressure sensitive button may activate the microprocessor, NIC, or touch-sensitive screen of the smart card.

The smart card may operate in a networked environment. The smart card may support establishing communication channels with one or more issuer or acquirer bank systems. The smart card may connect to a local area network ("LAN"), a wide area network ("WAN") a cellular network or any suitable communication network. When used in a LAN networking environment, the smart card may be connected to the LAN through a network interface or adapter. The NIC may include the network interface or adapter.

When used in a WAN networking environment, the smart card may include a modem or other means for establishing communications over a WAN, such as the Internet. The NIC may include the modem. It will be appreciated that the existence of any of various well-known protocols such as TCP/IP, Ethernet, FTP, HTTP and the like is presumed.

The smart card may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The smart card may utilize computer-executable instructions, such as program modules, being executed by a computer. Generally, program modules include routines, programs, objects, components, data structures, etc. that perform particular tasks or implement particular abstract data types. The smart card may be operational with distributed computing environments where tasks are performed by remote processing devices that are linked through a communications network. In a distributed computing environment, program modules may be located in both local and remote computer storage media including memory storage devices.

The smart card may include one or more batteries. A battery of the smart card may be flexible. The battery may be a power source for electronic hardware components of the smart card. For example, the battery may supply power to a touch-sensitive screen, NIC and microprocessor. The battery may have a thickness that is not greater than 0.5 mm.

The battery may be rechargeable. The battery may be recharged via any suitable method. Illustrative charging methods include solar charging, wireless inductive charging, and connection via a charging port.

In some embodiments, the smart card may include an electrical contact. The battery may be recharged via an electrical contact when the smart card is inserted into an Automated Teller Machine ("ATM"). An electrical contact may be constructed using any suitable material that conducts or transfers electricity. The smart card may include a plurality of electrical contacts. An electrical contact may be accessible on any suitable face of a housing of the smart card. The contact may be utilized to transfer electrical charge to the rechargeable battery when the smart card is inserted into a card reader of the ATM.

In some embodiments, the smart card's power source may include high frequency signals received from an ATM or other network node. The smart card may be configured to utilize received high frequency signals to recharge the battery or provide power to other hardware components of the smart card. The high frequency signals may conform to a standardized near field communication (NFC) communication standard.

Illustrative NFC protocols include European Computer Manufacturers Association Document Nos. 340 and 352 and International Organization for Standardization Document Nos. 18092 and 21481. All these standards are hereby incorporated by reference herein in their entireties.

The smart card may include a housing. The housing may provide a protective layer for internal components of the smart card. The housing may be flexible. The housing may be constructed from plastic or other suitable materials. The housing may define a form factor of the smart card. The microprocessor and other components of the smart card may be embedded in and protected by the housing. The smart card may include a wireless interface embedded in the housing. The wireless interface may include a NIC. The smart card may include a touch-sensitive screen on an outside surface of the housing.

The housing may have a thickness that is not greater than 0.8 millimeters ("mm") and a surface area that is not greater than 86 mm×54 mm. Such a compact form factor may allow the smart card to be inserted into traditional card readers and function as a typical debit or credit card.

For example, the user may use the smart card to access an ATM and withdraw cash. The user may also use the smart card to make a purchase at a traditional brick and mortar merchant location. The user may pay for such a purchase using a conventional point-of-sale ("POS") terminal at the brick and mortar location. When the smart card is inserted into a card reader of an ATM or POS terminal a battery of the smart card may be recharged.

The smart card may include a touch-sensitive screen. The touch-sensitive screen may capture finger motions. The finger motions may include transfer information entered by a user of the smart card. The microprocessor may capture the finger motions entered using the touch-sensitive screen.

The smart card may include specialized software (executable by the microprocessor) for automatic conversion of finger motions as they are input by the user on the touch-sensitive screen.

The touch-sensitive screen may utilize resistive touch technology to detect user touch points. Screens constructed using resistive touch technology include an upper layer (which is touched by the user) spaced apart from a bottom layer. When the user touches the screen, the upper layer contacts the bottom layer, generating an electrical signal. Screens constructed using resistive touch technology only require the application of pressure and do not require application of heat or electrical charge to detect a touch point. Resistive-touch technology is also relatively less expensive than other touch sensing technologies.

The touch-sensitive screen may utilize capacitive touch technology to detect user touch points. Screens constructed using capacitive touch technology may identify where a user touches based on detecting an electrical disturbance created when the user touches the screen. The human body is an electronical conductor and, contact with another conducting surface such as the surface of a touch-sensitive screen, typically generates a detectable electrical disturbance. Capacitive touch technology detects the electrical disturbance and determines where on the screen the user touched.

The touch-sensitive screen may utilize any suitable touch detection technology such as surface acoustic wave, optical imaging, infrared acrylic projection or acoustic pulse recognition technologies.

The smart card may include a touch-sensing controller for detecting a touched location. The touch-sensing controller may include an application-specific integrated circuit (ASIC) chip and a digital signal processor (DSP) chip.

In some embodiments, the touch-sensitive screen may provide "single-touch" functionality. In some embodiments, the touch-sensitive screen may provide "multi-touch" functionality. Single-touch functionality may detect input from one user touch on the touch-sensitive screen. For example, the touch-sensitive screen may display a list of payment options and the user may select one or the option by using a finger to touch the desired option. Single-touch functionality may also recognize double finger taps or a long-press functionality. Multi-touch functionality may detect input from two or more simultaneous user touch points on the touch-sensitive screen. For example, a pinch-to-zoom feature is a multi-touch functionality.

The touch-sensitive screen may include nano-thin light emitting diode ("LED") technology.

The touch-sensitive screen may include organic light emitting diode ("OLED") technology. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment. Furthermore, OLEDs may be used to construct a display that consumes less power compared to other display technologies.

The touch-sensitive screen may have a thickness that is not greater than 0.25 mm. The touch-sensitive screen may be flexible. The touch-sensitive screen may cover any suitable portion of a card surface. The touch-sensitive screen may cover an entire card surface.

The smart card may include a haptic response system. The haptic response system may provide a responsive force, vibration or movement in response to receiving a user's touch input. For example, the haptic response system may provide a responsive vibration to a user's touch-based selection of a transfer option. The haptic response system may include an eccentric (unbalanced) rotating mass, a linear resonant actuator, a piezoelectric actuator or any other suitable hardware for providing a haptic response.

The microprocessor and associated hardware may interpret finger motions of the user applied to the touch-sensitive screen. For example, the microprocessor may translate the user's finger motions into digital transfer information. The microprocessor may translate the user's finger motions into digital transfer instructions. The microprocessor may encrypt the captured finger motions.

The microprocessor may formulate a set of transfer instructions based on the captured finger motions. The microprocessor may formulate a set of transfer instructions based on a user's touch-based selection of a transfer option displayed on the touch-sensitive screen. The user may provide touch-based confirmation of the accuracy of a transfer instruction formulated by the microprocessor.

Illustrative finger motions entered using the touch-sensitive screen and encrypted by the microprocessor may include a personal identification number ("PIN") associated with the smart card, selection of a dependent account, and entry of a transfer amount.

The touch-sensitive screen may have an inactive state. In the inactive state, the touch-sensitive screen may be unable to capture data such as a user's touch inputs. When the touch-sensitive screen is in the inactive state, touch inputs including finger motions applied to the touch-sensitive screen may not be captured by the microprocessor.

The touch-sensitive screen may have an active state. In the active state, the touch-sensitive screen may be capable of capturing data, such as a user's touch inputs. The inactive state may be a default state of the touch-sensitive screen. A default inactive state may avoid the microprocessor capturing inadvertent touch inputs.

The microprocessor may toggle the touch-sensitive screen from the inactive state to the active state. The microprocessor may toggle the touch-sensitive screen from the active state to the inactive state.

The touch-sensitive screen may be configured to display a virtual keypad. The virtual keypad may include a display of input buttons that may be touch-selected by the user. The housing and the touch-sensitive screen collectively may have a thickness that is not greater than 0.8 mm.

The smart card may include executable instructions stored in a non-transitory memory. The executable instructions, when run by the microprocessor may receive an input from a user. For example, the input may include a user's touch-based selection of a transfer option displayed on a touch-sensitive screen. The input may include a transfer amount entered into a virtual keypad. The executable instructions may formulate a set of sensitive transfer instructions based on the input.

The formulated sensitive transfer instructions may incorporate sensitive transaction information stored on the smart card. Sensitive transaction information, as used herein, may include:

Primary Account Number ("PAN")
User name
Address
Telephone number
Expiration date
Service code
Authentication data
Personal Identification Number ("PIN")
PIN Block
Card validation value (CVV), or any other three/four-digit card security code The PAN is a typically multi-digit number printed on a front face of the smart card. The PAN may identify an issuer bank associated with the smart card. The smart card may correlate the specified issuer to the network address of a secure payment gateway. The PAN may identify a user account at the issuer bank.

A PIN associated with the smart card may be a secret numeric password known only to the user of the smart card. The PIN may be used to authenticate the user before providing access to a secure payment processing system. A user may only be granted access to the secure system if the PIN provided matches a PIN stored on the secure system. For example, a PIN may be used to authenticate the smart card at an ATM. A PIN may also be used to authorize a digital signature implemented by an EMV chip.

A PIN Block includes data used to encapsulate a PIN during processing and transmission of the PIN. The PIN block defines the location of the PIN within the PIN block and how it can be extracted from the PIN block. A typical PIN block includes the PIN, the PIN length, and may contain a subset of the PAN.

A service code may be a multidigit number. For example, in a three-digit service code, the first digit may indicate specific interchange rules that apply to the smart card. The second digit may specify authorization processing that is applied to the smart card when initiating a transaction. Illustrative authorization processing may include requiring submission of a PIN, biometric feature, signature or a combination thereof. The second digit may also identify a secure payment gateway that is authorized to process transfer instructions formulated by the smart card.

The third digit may specify a range of services that are authorized in connection with use of the smart card. For example, the third digit may indicate whether the smart card may be used at an ATM to withdraw cash or only to purchase goods or services from a merchant.

In some embodiments, the smart card may be a parent smart card associated with a parent account. The parent account may be linked to a dependent account. The dependent account may be associated with a dependent smart card. The parent smart card and the dependent smart card may be issued by the same card issuer or by different card issuers. The parent account and the dependent account may be associated with the same financial institution or different financial institutions.

The parent smart card may receive a communication regarding the dependent account. For example, the smart card may receive a communication indicating a low balance in a dependent account. The communication may be transmitted by the issuer of the parent smart card, the issuer of the dependent smart card or by any suitable party.

In some embodiments, the parent smart card may be automatically registered to receive communications in response to a previous transfer to the dependent account using the parent smart card. In some embodiments, the user may register the parent smart card with an issuer bank of the parent smart card or the dependent smart card. The communication may be pushed to the parent smart card.

The parent smart card may display any part of the communication on the touch-sensitive screen. The parent smart card may display one or more selectable transfer options on the touch-sensitive screen. The selectable options may include text, icons or any suitable graphical representations. For example, the parent smart card may display one or more preset transfer amount options such as "transfer $100 to John." In some embodiments, the parent smart card may display a sliding bar for adjusting the amount of the transfer. In some embodiments, the parent smart card may display a virtual keypad to enter an amount for a transfer. The parent smart card may prompt entry of a PIN or other suitable authorization before displaying the communication or the selectable transfer options.

In some embodiments a selectable transfer option may include a predetermined name or abbreviation associated with the dependent account. In some embodiments the names or abbreviations may be customized by the user. The customizing may be executed using the smart card touch-sensitive screen. The customizing may be executed using a smartphone application associated with the smart card, using a banking channel portal or using any suitable method.

The parent smart card may capture a user's touch-based selection of a transfer option displayed on the touch-sensitive screen. A payment controller on the parent smart card may identify a recipient and an amount of a transfer based on the captured input. The parent smart card may formulate transfer instructions based on the input. The parent smart card may encrypt the transfer instructions.

Using the wireless interface, the parent smart card may establish a direct communication channel with a secure payment gateway. A network address of the secure payment gateway may be identified in the transfer instructions. Only the secure payment gateway may be capable of decrypting the transfer instructions.

The secure payment gateway may be operated by an issuer or an acquirer bank. The secure payment gateway may credit the dependent account for the amount of the transfer. The secure payment gateway may debit the parent account for the amount of the transfer.

The parent smart card may transmit transfer instructions that include sensitive transaction information directly to the secure payment gateway for processing. In some embodiments, the parent smart card may transmit the sensitive transaction information to the payment gateway in a separate communication, distinct from transmission of transfer instructions. In some embodiments, the parent smart card may transmit the sensitive transaction information to a first payment gateway and transmit the transfer instructions to a second payment gateway. A secure payment gateway may process the transfer instructions thereby reducing an exposure risk of the sensitive transaction information.

The secure payment gateway may provide the parent smart card with confirmation that a transfer was completed. The confirmation may be displayed on the touch-sensitive screen. In some embodiments, the secure gateway may communicate with a dependent smart card associated with the dependent account. The secure gateway may provide the dependent smart card with confirmation that the transfer was completed.

In some embodiments, in addition to the confirmation the user may be provided the option to enter additional information using touch-based selection of an option. The secure payment gateway may trigger the smart card to prompt for the additional information.

In some embodiments, the smart card may receive confirmation directly from a financial institution system. After successfully processing the transfer instructions, the secure payment gateway may push a notification to the financial institution system confirming successful execution of the transfer instructions.

In some embodiments, the smart card may display selectable options associated with multiple transfers on the touch-sensitive screen. For example, the smart card may display an option to "transfer $100 to John" and an option to "transfer $100 to Lucy." The smart card may enable a touch-based input selecting multiple payment options.

A multiple payment handler embedded in the smart card may identify the multiple transfers associated with the selected options. The multiple payment handler may be a program module. The multiple payment handler may enable the smart card to securely execute concurrent transfers to different dependent accounts.

The multiple payment handler may communicate with a payment controller on the smart card. The payment controller may resolve different dependent accounts to the same secure gateway. The payment controller may resolve different dependent accounts to different secure payment gateways. The payment controller may resolve a first transfer to a first secure payment gateway. The wireless interface may communicate with the first secure payment gateway using a first communication protocol. Communication with the first secure payment gateway may be encrypted using a first encryption algorithm. The payment controller may resolve a second transfer to a second secure payment gateway. The wireless interface may communicate with the second secure payment gateway using a second communication protocol. Communication with the second secure payment gateway may be encrypted using a second encryption algorithm.

In some embodiments, the dependent smart card may initiate a request to prompt the parent smart card for a transfer. The dependent smart card may receive a communication related to the dependent account. For example, the dependent smart card may receive a communication indicating a low balance in the dependent account. The dependent smart card may display any part of the communication on a touch-sensitive screen. The dependent smart card may display a selectable option to request a transfer from the parent smart card user. In response to selection of the option, a communication may be sent to the parent smart card.

The smart card may include a biometric reader. The microprocessor may require submission of a valid biometric feature before attempting to establish a communication channel with the secure payment gateway. The microprocessor may require submission of a valid biometric feature before submitting the transfer instructions to the secure payment gateway.

In some embodiments, the microprocessor may require a touch-based confirmation from the user before transmitting transfer instructions to the secure payment gateway. The touch-based confirmation may include the screen displaying a confirmatory message and requiring the user to register confirmation by touching a target area of the screen.

In some embodiments, the smart card may include a fingerprint reader embedded within, or underneath the touch-sensitive screen. The user may register confirmation of transfer instructions by providing a fingerprint using the embedded fingerprint reader. The microprocessor may confirm whether the provided fingerprint matches a known fingerprint securely stored locally on the smart card. The microprocessor may display the target area associated with a confirmatory message overlaid above the embedded fingerprint reader. By pressing a finger against the target area, the user may register confirmation by touching a target area of the screen and simultaneously submit a fingerprint for verification.

A wireless interface of the smart card may include an inactive state. When in the inactive state, the wireless interface may be unable to connect to a communication channel or transmit data. The wireless interface may include an active state. In the active state, the wireless interface may be capable of connecting to a communication channel, receiving data or transmitting data. The microprocessor may toggle the wireless interface from the inactive state to the active state. The microprocessor may toggle the wireless interface from the active state to the inactive state.

For example, the microprocessor may detect that a valid PIN has been entered by the user of the smart card using the virtual keypad. In response to receiving the valid PIN, the microprocessor may toggle the wireless interface from the inactive to the active state. In response to receiving an invalid PIN, the microprocessor may maintain the wireless interface in the inactive state. In some embodiments, if the microprocessor detects a threshold number of invalid PIN entries, the microprocessor may lock the wireless interface.

The microprocessor may require a special code to unlock the wireless interface. The microprocessor may require that the smart card establish a wired connection to unlock the wireless interface. For example, the wireless interface may only be unlocked when the smart card is inserted into a card reader of an ATM. The smart card may also require entry of a valid PIN to access the ATM before unlocking the wireless interface.

The smart card may include a voice controller. The voice controller may generate an audio message confirming the microprocessor's interpretation of the user's touch inputs applied to the touch-sensitive screen and captured by a display controller. The microprocessor may prompt the user to touch a target area of the screen to confirm an accuracy of the generated audio message. In response to receiving the user's confirmation, the microprocessor may generate transfer instructions for executing the payment identified in the audio message.

The smart card may include a voice controller. The voice controller may generate an audio message confirming a substance of the encrypted transfer instructions generated by the smart card. For example, the voice controller may generate an audible message that identifies a transfer amount.

The voice controller may generate this audible message before transfer instructions and any associated sensitive transaction information are transmitted to the secure payment gateway. After the voice controller generates the audible message, the microprocessor may not transmit the encrypted transfer instructions to the payment gateway until receiving authorization entered using the touch-sensitive screen. The authorization may be entered by pressing target keys on a virtual keypad or by selecting a selectable option on the touch-sensitive screen to confirm that the user of the smart card wishes to proceed with the transaction.

In some embodiments, the microprocessor may prompt the user to touch a target area of the screen to confirm an accuracy of the generated audio message. In response to receiving the user's confirmation, the microprocessor may generate transfer instructions for executing the transfer identified in the audio message. In some embodiments, the audio message may itself specify one or more target authorization keystrokes. Illustrative target authorization keystrokes may include pressing two or more keys concurrently or a specified sequence of keys.

A system for enabling direct online transfers while improving the security of sensitive transaction information is provided. The system may include a smart card having a thickness not greater than 0.8 mm and a surface area not greater than 86 mm×54 mm. The smart card may include hardware components such as a communication interface and a microprocessor. The smart card may include a user input system in electronic communication with the microprocessor. The user input system may include a touch-sensitive screen and a display controller. The display controller may capture touch inputs entered using the touch-sensitive screen.

The smart card may include a touch-sensitive screen. The touch-sensitive screen may display a virtual keypad. The touch-sensitive screen may not expand the form factor of the smart card beyond 86 mm×54 mm×0.8 mm.

The smart card may include a wireless communication interface. The wireless communication interface may be configured to communicate using any suitable wireless communication protocol. Exemplary wireless communication protocols may include Wi-Fi, ZigBee, cellular and NFC.

The smart card may include a microprocessor. The microprocessor may be configured to control overall operation of the smart card and its associated components. The smart card may include executable instructions stored in a non-transitory memory. The executable instructions, when run by the microprocessor, may configure the microprocessor to take actions or control operation of one or more components of the smart card.

The executable instructions, when run by the microprocessor may formulate transfer instructions. The microprocessor may encrypt the transfer instructions. The microprocessor may formulate transfer instructions based on user input via the touch-sensitive screen.

The microprocessor may activate a wireless interface of the smart card. The wireless interface may include a NIC. Using the wireless interface, the microprocessor may establish a communication link with a secure payment gateway. A network address of the payment gateway may be stored on the smart card. For example, the network address of a secure payment gateway may be stored in firmware of the smart card's NIC.

In other embodiments, the smart card may include a payment controller. The payment controller may determine a network address of a secure payment gateway based on a communication regarding a payment due. The payment controller may determine a network address of a secure payment gateway based on a user input via the touch-sensitive screen. The payment controller may resolve different inputs to different payment gateways.

The payment controller may determine an appropriate payment gateway based on the identity of a financial institution. For example, different financial institutions may be associated with different acquirer banks. Each of the acquirer banks may utilize different security or communication protocols. The payment controller may direct the smart card to a payment gateway that is compatible with the security or communication protocols utilized by a particular acquirer bank.

The payment controller may determine an appropriate payment gateway based on the amount of a transfer. For example, a payment gateway that requires higher level security and authentication may be utilized for larger transfers.

The executable instructions, when run by the microprocessor, may authenticate the smart card to the payment gateway over the secure communication channel. The microprocessor may transmit the encrypted transfer instructions to the payment gateway. The payment gateway may then process the transfer instructions received from the smart card.

Processing the transfer instructions may include debiting an account of the smart card user an amount corresponding to the transfer amount. After debiting a user account, the payment gateway may provide confirmation to the smart card.

By interacting with the payment gateway, the system insulates sensitive information from being exposed to potentially unsecure third-party systems. The user input may succinctly identify information needed to process a transfer. The user input may be securely entered directly into the smart card. The smart card then securely communicates with a secure payment gateway to process the transfer based on the information provided in the user input.

Methods for securing sensitive transaction information stored on a smart card are provided. Methods may include completing an online transfer without transmitting sensitive transaction information directly to a third-party computer system. A third-party system may be defined as any system that is not operated by an issuer of the smart card. Methods may include, using a touch-screen of the smart card, selecting a transfer option displayed on the touch-sensitive screen. Methods may include, using a virtual keypad of the smart card, entering a transfer amount.

Methods may include generating transfer instructions. The transfer instructions may integrate sensitive transaction information stored locally on the smart card. Methods may include determining a network address of a secure payment gateway. Using a wireless interface of the smart card, methods may include establishing a secure communication channel with the secure payment gateway.

Methods may include transmitting the transfer instructions to the secure payment gateway using the secure communication channel. The secure payment gateway may provide a secure interface, operated by an issuer of the smart card, for insulating the sensitive transaction information stored on the smart card from direct interaction with a third party-system.

Methods may include capturing transfer information using a touch-sensitive screen embedded in a smart card. The touch-sensitive screen may display payment options that may be selected by a user of the smart card. The user may touch one or more of the displayed transfer options.

The user may enter custom transfer options. For example, using touch inputs, the user may instruct the microprocessor to display a virtual keypad on the touch-sensitive screen. The user may the touch displayed virtual keys to enter customized transfer details. The user may also use touch inputs to navigate menus displaying transfer options or other details that may be selected by the user. The user may use touch inputs to confirm or edit a transfer amount.

Based on the transfer options touched (e.g., selected) by the user, the microprocessor may formulate transfer instructions. Capturing the transfer information may include capturing touch inputs of a user applied to the touch-sensitive screen. Capturing the transfer information may include the microprocessor translating finger motions applied to the touch-sensitive screen into digital transfer instructions.

The smart card may include a payment controller. The payment controller may be configured to resolve selection of a transfer to a known secure system. The payment controller may determine whether the system meets security requirements set by the issuer of the smart card. The secure system may securely process the transfer instructions formulated by the smart card.

In some embodiments, before connecting to the secure system, the smart card may obtain approval for communicating with the secure system from an issuer bank. The smart card may use the wireless interface to request and receive approval to communicate with the secure system from the issuer.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

Figure 1:
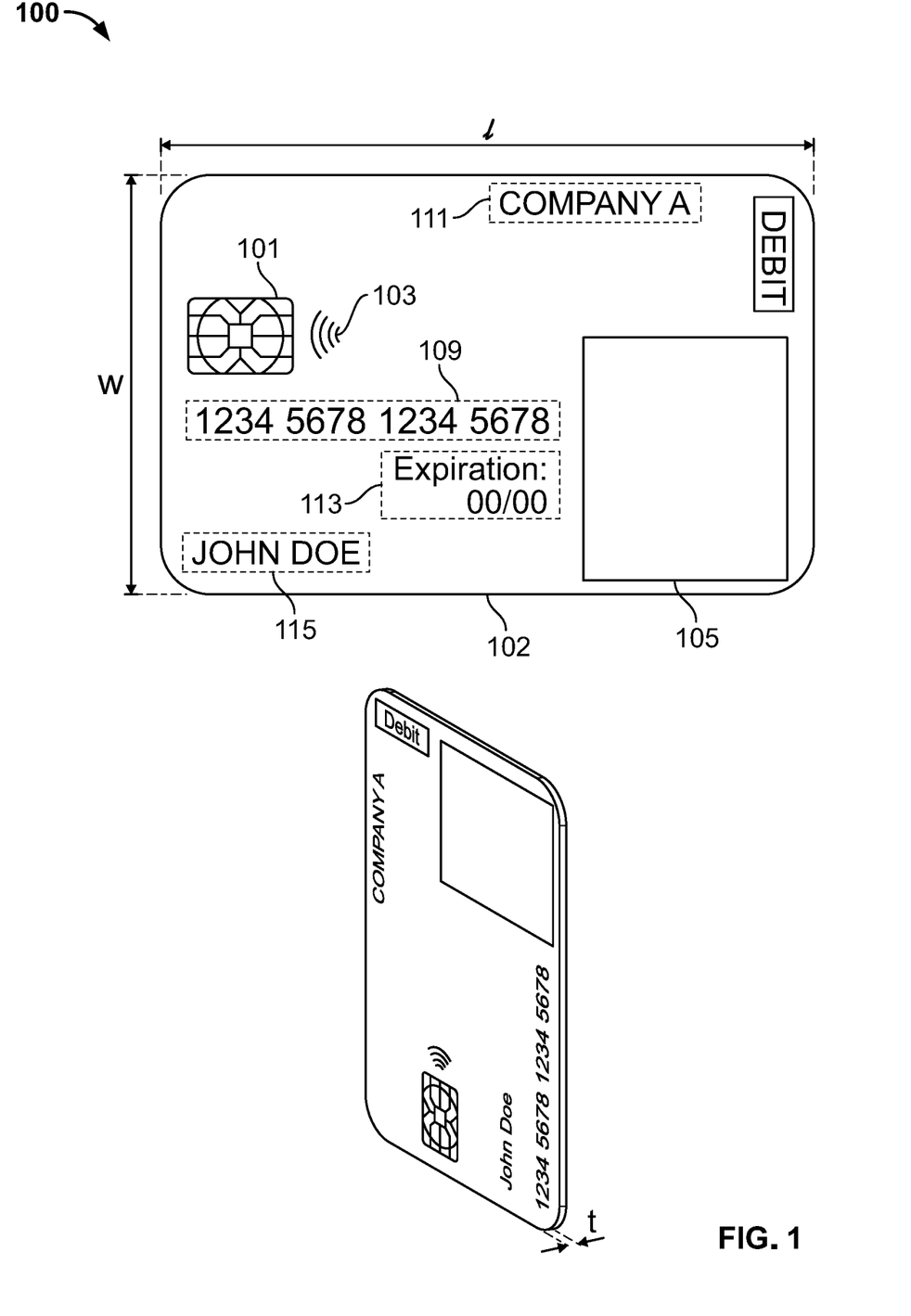
FIG. 1 shows illustrative apparatus in accordance with principles of the disclosure.

FIG. 1 shows illustrative smart card 100. Smart card 100 includes touch-sensitive screen 105. Touch-sensitive screen 105 may be used by a user of smart card 100 to select a transfer option or enter information. Exemplary information may include a PIN or a transfer amount.

Smart card 100 includes a microprocessor and other components for capturing, encrypting and storing information entered by a user. Smart card 100 may also include executable instructions for packaging information entered via touch-sensitive screen 105 into transfer instructions that may be executed by a secure payment gateway. The executable instructions may also formulate the transfer instructions based on sensitive transaction information stored on the smart card.

FIG. 1 shows that smart card 100 includes chip 101. Chip 101 may provide an electrical contact that is accessible through housing 102. Chip 101 may provide an electrical contact for establishing a wired or contact-based communication channel with an ATM or POS terminal when card 100 is inserted into a card reader of the ATM or POS terminal. Chip 101 may be an EMV chip.

Chip 101 may store a copy of information printed on a face of smart card 100. For example, chip 101 may store PAN 109, user name 115, expiration date 113 and issuing bank 111. Chip 101 may also store encrypted security information. The encrypted security information may be utilized to provide a "second factor" method of authentication prior to triggering execution of transfer instructions.

For example, smart card 100 may package information entered by user 115 via touch-sensitive screen 105 into transfer instructions. The transfer instructions may include a PIN associated with smart card 100. The transfer instructions may be submitted for execution to a payment gateway without requiring any further input from user 115.

After a payment gateway receives transfer instructions formulated by smart card 100, the payment gateway may first verify that the PIN included in the payment instructions is associated with smart card 100. For example, the payment gateway may communicate with a remote payment processing server operated by the issuer and determine whether the received PIN is associated with user name 115 and/or PAN 109.

As a second factor method of authentication, the payment gateway may determine whether the PIN included in the transfer instructions successfully unlocks encrypted security information stored on chip 101. If the PIN successfully unlocks the encrypted security information, the payment gateway may execute the received transfer instructions.

Smart card 100 may be any suitable size. FIG. 1 shows that smart card 100 has width w and length l. For example, width w may be 53.98 millimeters ("mm"). Length l may be 85.60 mm. Smart card 100 has thickness t. An illustrative thickness t may be 0.8 mm. An exemplary form factor of smart card 100 may be 53.98 mm×85.60 mm×0.8 mm. Such an exemplary form factor may allow smart card 100 to conveniently fit into a user's wallet or pocket. This exemplary form factor may allow smart card 100 to fit into a card reader of an ATM or POS terminal.

Figure 2A:
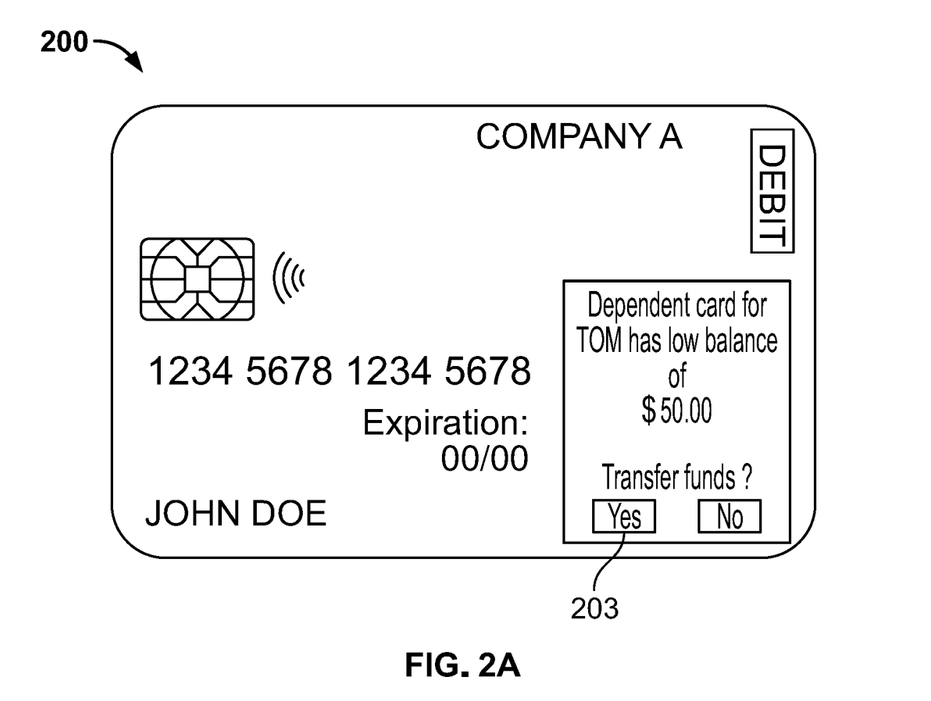
FIG. 2A shows illustrative apparatus in accordance with principles of the disclosure.
Figure 2B:
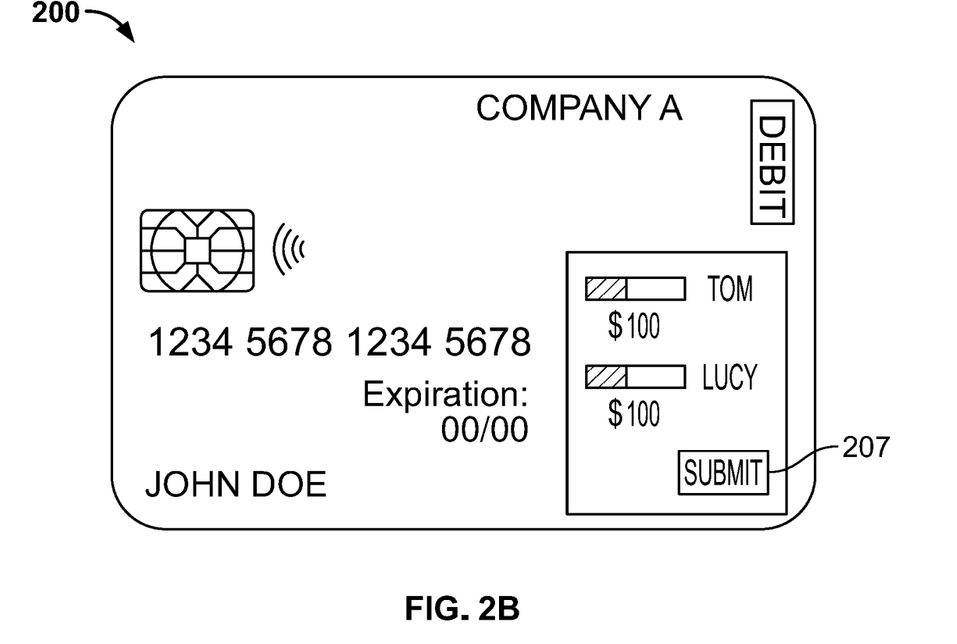
FIG. 2B shows illustrative apparatus in accordance with principles of the disclosure.

FIGS. 2A and 2B show illustrative parent smart card 200. Parent smart card 200 may include one or more features of smart card 100 (shown in FIG. 1). Parent smart card 200 includes touch-sensitive screen 205. Touch-sensitive screen 205 may include one or more features of touch-sensitive screen 105.

Touch-sensitive screen 205 shows illustrative selectable transfer options that may be selected by a user to enter information. The selectable options may include text or any suitable graphic representation. In FIG. 2A, touch-sensitive screen 205 displays a communication regarding a dependent account. A user may touch selectable option 203 to initiate a transfer.

In FIG. 2B, touch-sensitive screen 205 of parent smart card 200 displays additional selectable transfer options. In response to a selection to initiate a transfer, touch-sensitive screen 205 shows sliding bars for adjusting the amount of the transfer. Touch-sensitive screen 205 shows dependent accounts for "Tom" and "Lucy." The user may adjust the transfer amounts for each account. In some embodiments, the touch-sensitive screen may display a virtual keypad or other method for entering a transfer amount.

In FIG. 2B, touch-sensitive screen 205 includes submit button 207. A user may touch submit button 207 after entering a transfer amount. Touching submit button 207 may trigger storage of the transfer amount locally on parent smart card 200. Touching submit button 207 may trigger formulation of payment instructions based on the transfer amount. Touching submit button 207 may activate a NIC of parent smart card 200. Once activated, the NIC may scan for an available secure communication channel.

In some embodiments, in response to a prompt displayed on touch-sensitive screen 205, a user may enter a PIN. The user may be prompted to enter a PIN to confirm that that the user is authorized to initiate a transaction using parent smart card 200. A microprocessor may toggle a wireless interface of parent smart card 200 from the inactive state to the active state in response to receiving a valid PIN entered using the touch-sensitive screen.

Figure 3:
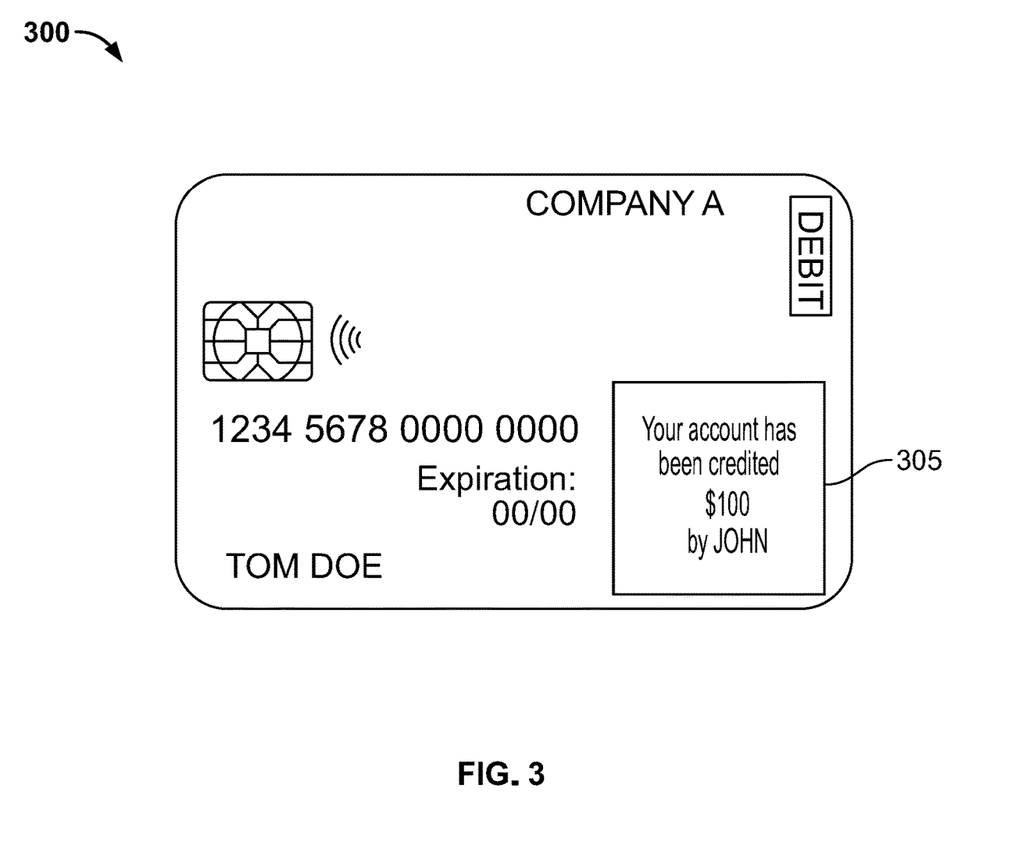
FIG. 3 shows illustrative apparatus in accordance with principles of the disclosure.

FIG. 3 shows illustrative dependent smart card 300. Dependent smart card 300 may include one or more features of smart card 100 (shown in FIG. 1) and smart card 200 (shown in FIGS. 2A and 2B). Dependent smart card 300 includes touch-sensitive screen 305. Touch-sensitive screen 305 may include one or more features of touch-sensitive screen 105 and touch-sensitive screen 205.

Touch-sensitive screen 305 displays a communication regarding a dependent account associated with dependent smart card 300. The communication confirms that $100 has been transferred by parent card 200 as shown in FIGS. 2A and 2B.

Figure 4:
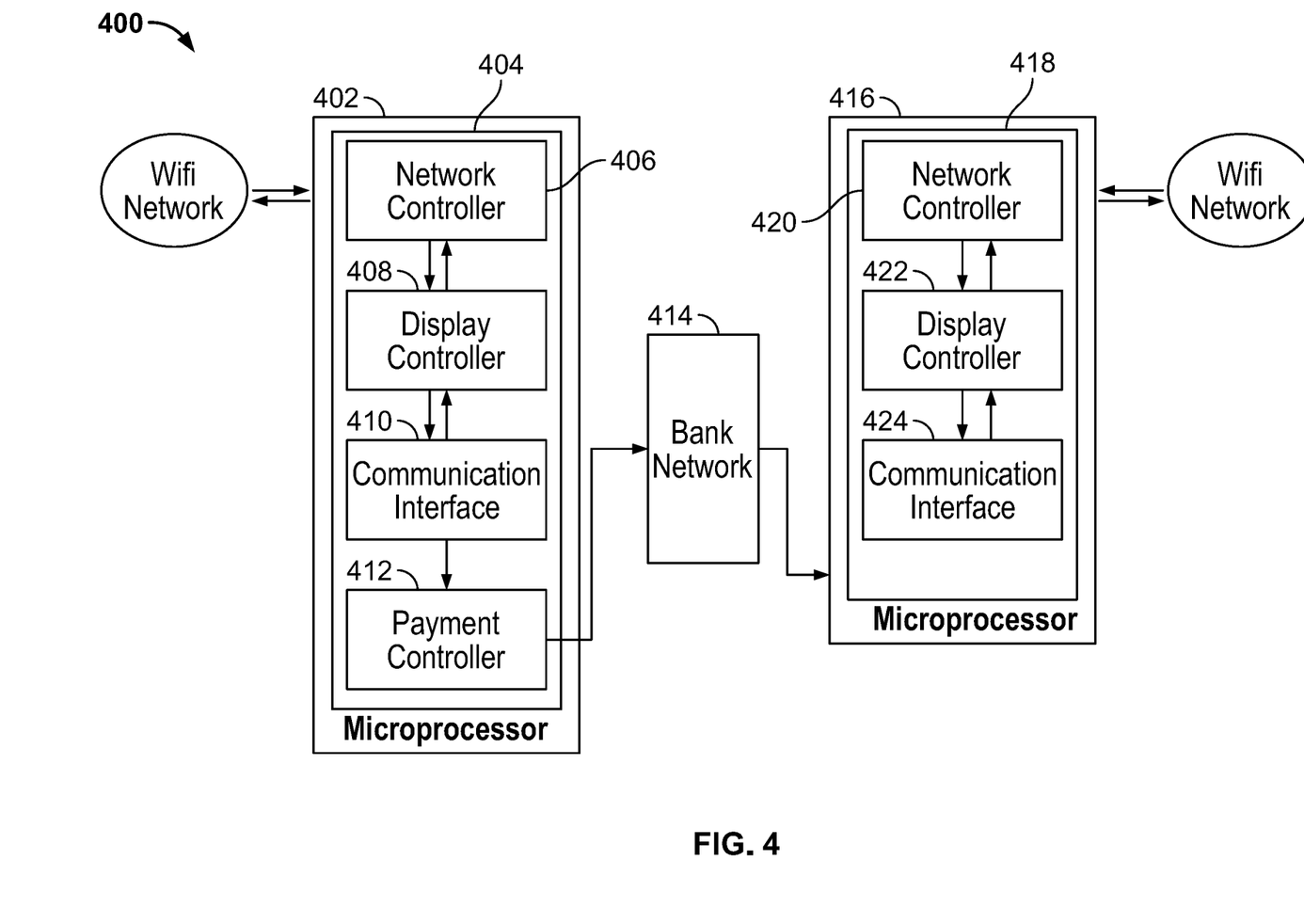
FIG. 4 shows an illustrative apparatus and process in accordance with principles of the disclosure.

FIG. 4 shows illustrative system architecture 400. System architecture 400 includes smart cards 402 and 416. Smart cards 402 and 416 may include one or more features of smart card 100, smart card 200 and/or smart card 300.

Parent smart card 402 includes microprocessor 404. Microprocessor 404 may control operation of network controller 406, display controller 408, communication interface 410 and payment controller 412. Components 404, 406, 408, 410 and 412 are all resident on parent smart card 402.

FIG. 4 shows that parent smart card 402 connects to a Wi-Fi network using network controller 406. Network controller 406 may be an embedded NIC. The NIC may include its own dedicated microprocessor and memory. The NIC may be a microelectromechanical device that fits within the small form factor associated with parent smart card 402. The NIC may prepare data generated by a microprocessor on smart card 402 for transmission to a payment gateway or other secure computer system.

Display controller 408 controls the display on a touch-sensitive screen of the card. For example, the touch-sensitive screen may display a communication received over the wifi network. The touch-sensitive screen may display one or more transfer options. Display controller 408 may capture data entered using the touch-sensitive screen. Display controller 408 may encrypt data captured by the touch-sensitive screen. Illustrative encryption algorithms include RSA cryptography, Blowfish, AES, RC4, RC5, and RC6. Display controller 408 may store captured data locally on parent smart card 402.

Communication interface 410 controls communication between card components. For example, display controller 408 may receive an input from the touch-sensitive screen selecting a transfer option and communication interface 410 may communicate the input to payment controller 412.

Payment controller 412 identifies a dependent account associated with a transfer option captured by smart card 402. Based on the identification, parent smart card 402 establishes a secure communication channel with a payment gateway. In some embodiments, the payment gateway may be part of bank network 414.

A network address associated with the payment gateway may be identified based on the transfer option selected. In some embodiments, a network address associated with the payment gateway may be identified based on a transfer amount captured by parent smart card 402. Transfers of different tier transfer amounts may be routed to different payment gateways. In other embodiments, the network address of a payment gateway may be hardwired into the NIC.

A payment gateway may perform one or more checks to verify transfer instructions received from parent smart card 402. For example, the payment gateway may prompt a user of parent smart card 402 to enter a PIN using a virtual keypad displayed on a touch-screen.

After authenticating transfer instructions received from smart card 402, the payment gateway may submit the payment instructions for settlement. Bank network 414 may facilitate settlement of funds. Bank network 414 may ensure that funds corresponding to the transfer are debited from a parent account associated with parent smart card 402. Bank network 414 may ensure that funds corresponding to the transfer are credited to the dependent account associated with dependent smart card 416. The financial institution associated with bank network 414 may be an issuer of parent smart card 402 and/or dependent smart card 416.

Bank network 414 may transmit confirmation of the transfer to dependent smart card 416. Dependent smart may include microprocessor 418. Microprocessor 418 may control operation of network controller 420, display controller 422 and communication interface 424. Components 418, 420, 422, and 424 are all resident on smart card 416.

Network controller 420 may establish a connection with a wifi network for communication with bank network 414. Bank network 414 may transmit the confirmation via the wifi network. Communication interface 424 may communicate the confirmation to display controller 422. Display controller 422 may display the confirmation on a touch-sensitive screen of dependent smart card 416.

Figure 5:
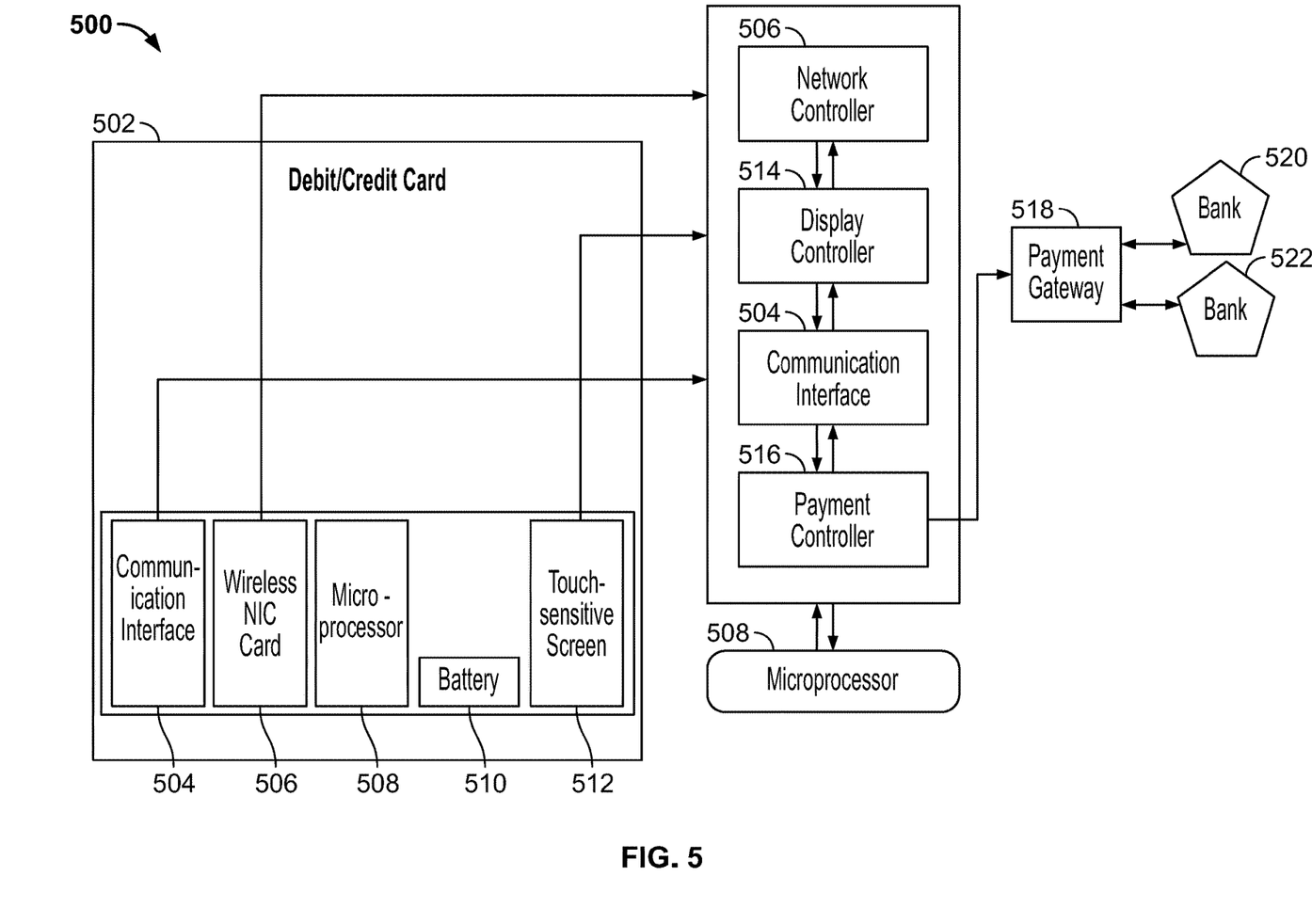
FIG. 5 shows an illustrative apparatus and process in accordance with principles of the disclosure.

FIG. 5 shows illustrative system architecture 500. FIG. 5 shows components of smart card 502. Smart card 502 may include one or more features of smart cards 100, 200, 300 and/or 402. Smart card 502 includes microprocessor 508 which controls overall operation of smart card 502 and its associated components. For example, microprocessor 508 may control operation of NIC 506 and communication with payment gateway 518.

Microprocessor 508 may formulate transfer instructions destined for bank 520. Bank 520 may be associated with a parent account. Such transaction instructions may be forwarded to bank 520 by payment gateway 518. In some embodiments, smart card 502 may be configured to directly communicate with bank 520. For example, bank 520 may request authentication, such as a PIN, before debiting an account associated with smart card 502 based on received payment instructions.

Microprocessor 508 may formulate transfer instructions destined for bank 522. Bank 522 may be associated with a dependent account that is linked to the parent account. Such transfer instructions may be forwarded to bank 522 by payment gateway 518. In some embodiments, smart card 502 may be configured to directly communicate with parent bank 522. For example, after a successful execution of transfer instructions by payment gateway 518, smart card 502 may receive confirmation from bank 522. In some embodiments the parent account and the dependent account may be associated with the same bank.

Figure 6:
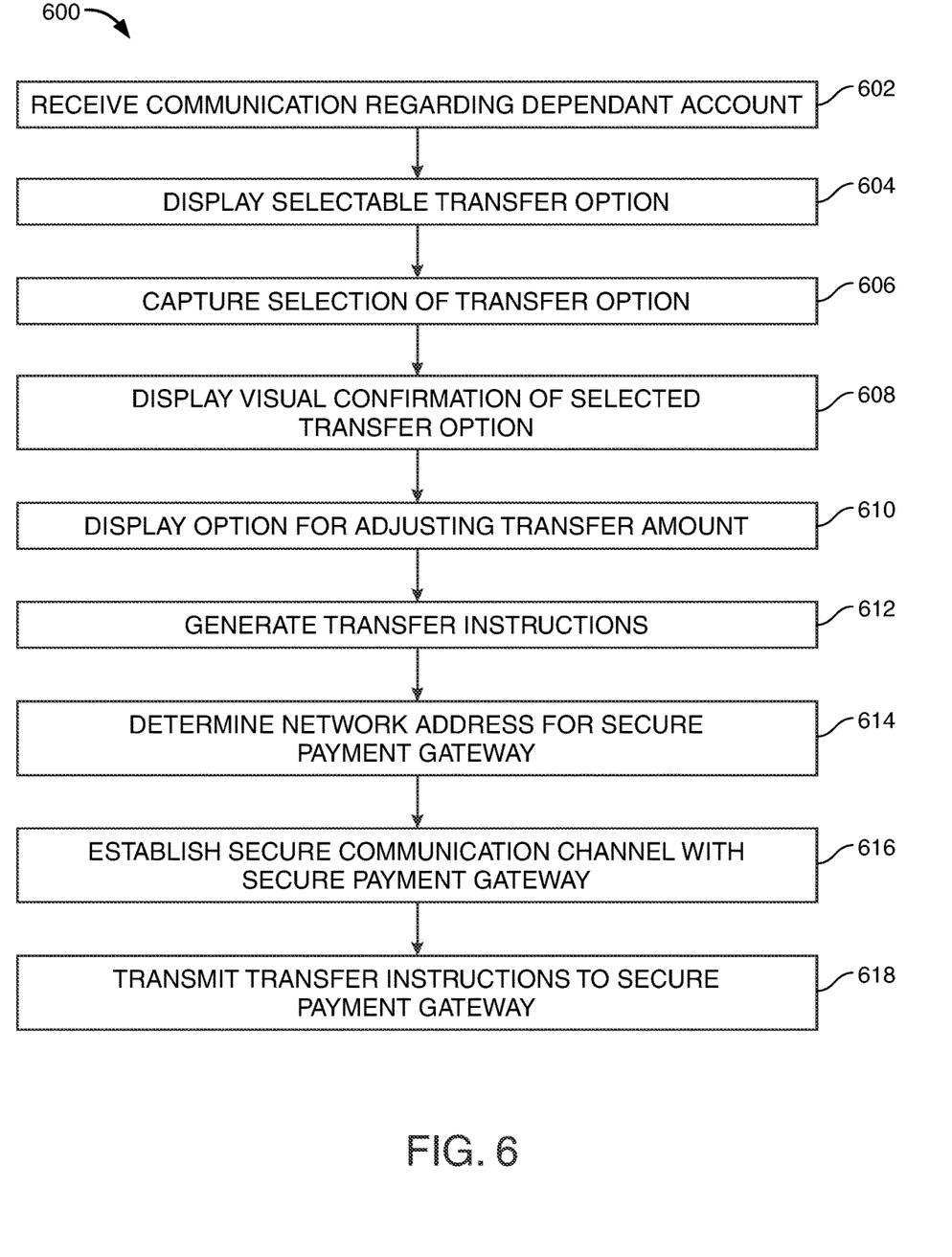
FIG. 6 shows an illustrative process flow in accordance with principles of the disclosure.

FIG. 6 shows process flow 600 for enabling online transfers from a smart card while securing sensitive transaction information stored on the smart card. The smart card may be associated with a parent account that is linked to a dependent account. The smart card may include a touch-sensitive screen, a payment controller, and a wireless interface.

At step 602, the smart card may receive a communication regarding the dependent account. The communication may be initiated in response to an instruction from a dependent smart card associated with the dependent account. At step 604, in response to the communication, the smart card may display a selectable transfer option.

At step 606, the smart card may capture selection of a transfer option at the touch-sensitive screen. At step 608, the screen may display visual confirmation of the selected transfer option on the touch-sensitive screen. At step 610, the touch-sensitive screen may display an option for adjusting a transfer amount.

At step 612, the smart card may generate transfer instructions. The transfer instructions may integrate the sensitive transaction information stored on the smart card and transfer information associated with the captured selections.

At step 614, the payment controller may determine a network address for a secure payment gateway. The network address may be based on the captured selection. At step 616, the wireless interface may establish a secure communication channel with the secure payment gateway. At step 618, the smart card may transmit the transfer instructions to the secure payment gateway using the secure communication channel. The secure payment gateway may provide a secure interface for insulating the sensitive transaction information stored on the smart card.

Figure 7:
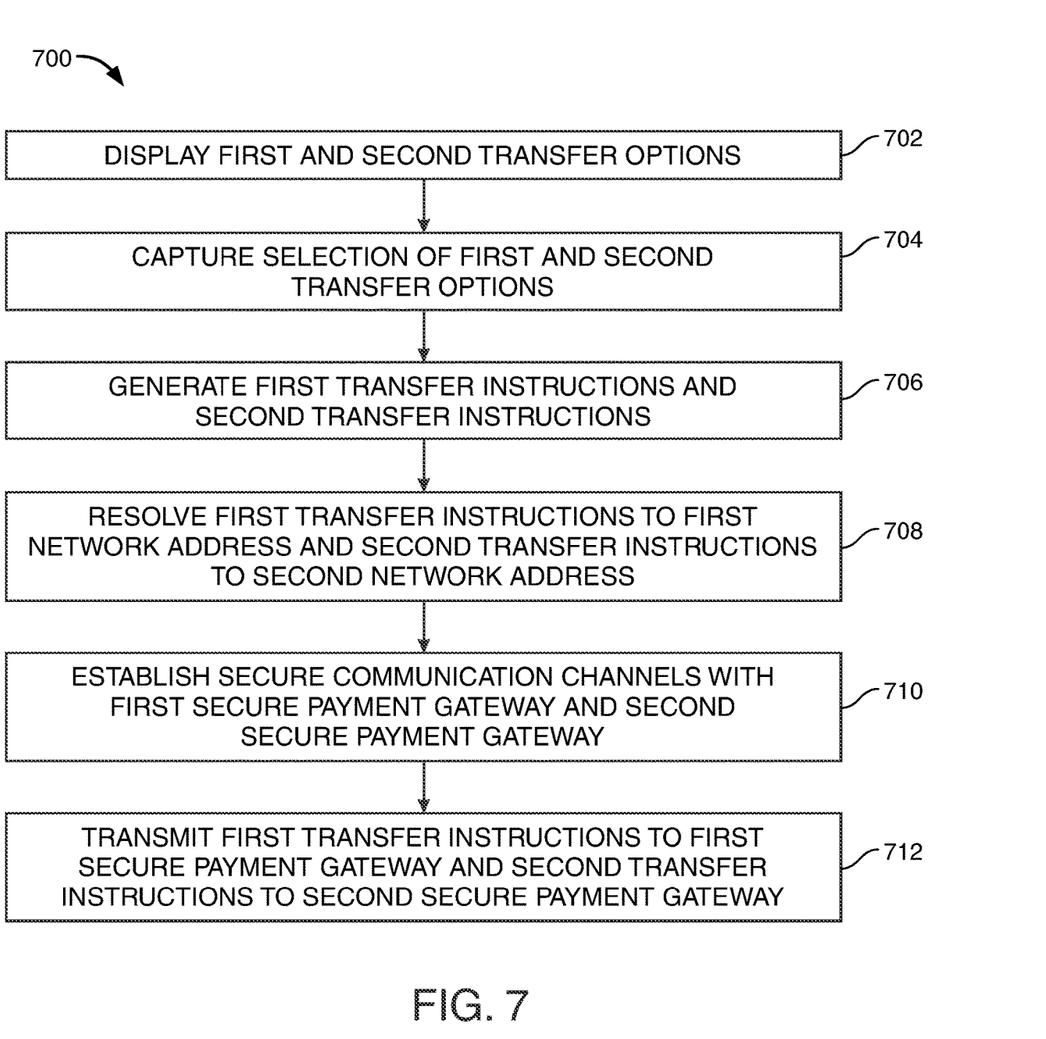
FIG. 7 shows an illustrative process flow in accordance with principles of the disclosure.

FIG. 7 shows process flow 700 for enabling multiple simultaneous online transfers from a smart card while securing sensitive transaction information stored on the smart card. The smart card may be associated with a parent account that is linked to two or more dependent accounts. The smart card may include a touch-sensitive screen, a payment controller, and a wireless interface.

At step 702, the touch-sensitive screen may display a first transfer option for a transfer to a first dependent account and a second transfer option for a transfer to a second dependent account.

At step 704, the smart card may capture a touch-based input selecting both the first transfer option and the second transfer option. At step 706, the smart card may generate first transfer instructions and second transfer instructions. The transfer instructions may integrate sensitive transaction information stored on the smart card and transfer information associated with the captured selection.

At step 708, the payment controller may resolve the first transfer instructions to a first network address associated with the first secure payment gateway and the second transfer instructions to a second network address associated with a second secure payment gateway. At step 710, the wireless interface may establish secure communication channels with the first secure payment gateway and the second secure payment gateway. At step 712, the smart card may transmit the first transfer instructions to the first secure payment gateway and the second transfer instructions to the second secure payment gateway using the secure communication channels.

Thus, methods and apparatus for SMART CARD DEPENDENT TRANSFER TECHNOLOGY are provided. Persons skilled in the art will appreciate that the present invention can be practiced by other than the described embodiments, which are presented for purposes of illustration rather than of limitation, and that the present invention is limited only by the claims that follow.

What is claimed is:

1. A smart payment card that enables direct online transfers and improves security of sensitive transaction information, the smart payment card having a thickness that is not greater than 0.8 millimeters ("mm") and associated with a parent account that is linked to a dependent account, the smart card comprising:
a housing;
a wireless communication interface embedded in the housing;
a microprocessor embedded in the housing;
a battery for powering the communication interface and the microprocessor;
a touch-sensitive screen that captures finger motions; and
executable instructions stored in a non-transitory memory, that when run by the microprocessor:
display a communication associated with the dependent account using the touch-sensitive screen;
capture a touch-based selection of a transfer option using the touch-sensitive screen;
based on the captured selection, formulate a set of transfer instructions;
using the wireless interface, establish a direct communication channel with a secure payment gateway identified in the transfer instructions; and
transmit the transfer instructions directly to the secure payment gateway for processing;
wherein:
the selectable transfer option is a first selectable transfer option associated with a first dependent account and the executable instructions when run by the microprocessor using the touch-sensitive screen, display a second selectable transfer option associated with a second dependent account; and
the set of transfer instructions is a first set of transfer instructions, the secure payment gateway is a first secure payment gateway, and the executable instructions when run by the microprocessor:
capture a touch-based input selecting both the first selectable transfer option and the second selectable transfer option;
formulate a second set of transfer instructions for the second selectable transfer option; and
using a payment interface, resolve the first transfer instructions to a first network address associated with a first secure payment gateway and the second transfer instructions to a second network address associated with a second secure payment gateway.

2. The smart payment card of claim 1, wherein the card further comprises a payment controller configured to determine a network address of the secure payment gateway, the network address based at least in part on the captured selection.

3. The smart payment card of claim 1, wherein the executable instructions when run by the microprocessor:
capture a touch-based selection of the option to edit a transfer amount;
display a virtual keypad using the touch sensitive screen;
capture an edited transfer amount via a touch-based input using the virtual keypad; and
formulate the transfer instructions based, at least in part, on the edited transfer amount.

4. The smart payment card of claim 1, wherein the executable instructions stored in the non-transitory memory, when run by the microprocessor receive confirmation from the secure payment gateway via the wireless interface that the transfer instructions formulated by the smart card have been successfully executed.

5. The smart payment card of claim 1 wherein the smart payment card further comprises a biometric reader and the computer-executable instructions, when run by the microprocessor require capturing, using the biometric reader, a valid biometric feature before transmitting the transfer instructions to the secure payment gateway.

6. The smart payment card of claim 1, wherein the housing and the touch-sensitive screen collectively have a thickness that is not greater than 0.8 millimeters ("mm") and a surface area not greater than 86 mm×54 mm.

7. The smart payment card of claim 1, wherein:
the wireless interface comprises:
an inactive state in which the wireless interface is unable to transmit data; and
an active state in which the wireless interface is capable of transmitting data; and
the microprocessor toggles the wireless interface from the inactive state to the active state in response to receiving a valid personal identification number ("PIN") entered using a virtual keypad displayed on the touch-sensitive screen.

8. The smart payment card of claim 1, wherein in response to selection of a transfer option, the executable instructions when run by the microprocessor:
display a transfer amount using the touch-sensitive screen;
display a selectable option to confirm the transfer amount using the touch-sensitive screen; and
display a selectable option to edit the transfer amount using the touch-sensitive screen.

9. A method of enabling online transfers from a smart card while securing sensitive transaction information stored on the smart card, the smart card having a thickness that is not greater than 0.8 millimeters ("mm") and associated with a parent account that is linked to a dependent account, the method comprising:
using a touch-sensitive screen of the smart card, capturing a selection of a transfer option;
generating transfer instructions that integrate the sensitive transaction information stored on the smart card and transfer information associated with the captured selection;
using a payment controller of the smart card, determining a network address for a secure payment gateway, the network address based at least in part on the captured selection,
using a wireless interface of the smart card establishing a secure communication channel with the secure payment gateway; and
transmitting the transfer instructions to the secure payment gateway using the secure communication channel, wherein the secure payment gateway provides a secure interface for insulating the sensitive transaction information stored on the smart card;
wherein:
the selectable transfer option is a first selectable transfer option associated with a first dependent account and the executable instructions when run by the microprocessor using the touch-sensitive screen, displaying a second selectable transfer option associated with a second dependent account; and
the transfer instructions is a first set of transfer instructions, the secure payment gateway is a first secure payment gateway, and the executable instructions when run by the microprocessor:
capturing a touch-based input selecting both the first selectable transfer option and the second selectable transfer option;
formulating a second set of transfer instructions for the second selectable transfer option; and
using a payment interface, resolving the first transfer instructions to a first network address associated with a first secure payment gateway and the second transfer instructions to a second network address associated with a second secure payment gateway.

10. The method of claim 9, wherein the selectable transfer option is displayed in response to a communication regarding the dependent account.

11. The method of claim 9, wherein the communication is initiated in response to an instruction from a dependent smart card associated with the dependent account.

12. The method of claim 9, the method further comprising:
displaying the first transfer option and a second transfer option for a transfer to a second dependent account using the touch-sensitive screen;
capturing a touch-based input selecting both the first transfer option and the second transfer option;
generating second transfer instructions; and
using the payment controller, resolving the first transfer instructions to a first network address associated with the first payment gateway and the second transfer instructions to a second network address associated with a second secure payment gateway.

13. The method of claim 9, further comprising:
using the touch-sensitive screen, providing visual confirmation of the captured selection of a transfer option; and
displaying, using the touch-sensitive screen, an option for adjusting a transfer amount.

14. A system for enabling direct online transfers while securing transmission of sensitive transaction information, the system comprising a smart card having a thickness not greater than 0.8 millimeters ("mm") and a surface area not greater than 86 mm×54 mm and comprising:
a wireless communication interface;
a microprocessor; and
a user input system in electronic communication with the microprocessor, the user input system comprising:
a touch-sensitive screen;
a display controller that captures data entered using the touch-sensitive screen; and
executable instructions stored in a non-transitory memory, that when run by the microprocessor:
formulate encrypted transfer instructions based on selection of a transfer option captured by the touch-sensitive screen;
establish a secure communication link with a payment gateway using the wireless interface;
authenticate the smart card over a secure communication channel to the payment gateway; and
transmit the encrypted transfer instructions to the payment gateway;
wherein:
the selectable transfer option is a first selectable transfer option associated with a first dependent account and the executable instructions when run by the microprocessor using the touch-sensitive screen, display a second selectable transfer option associated with a second dependent account; and
the encrypted transfer instructions is a first set of transfer instructions, and the executable instructions when run by the microprocessor:
capture a touch-based input selecting both the first selectable transfer option and the second selectable transfer option;
formulate a second set of transfer instructions for the second selectable transfer option; and using a payment interface, resolve the first transfer instructions to a first network address associated with a first secure payment gateway and the second transfer instructions to a second network address associated with a second secure payment gateway.

15. The system of claim 14, the smart card further comprising a voice controller, the voice controller configured to:

generate an audio message confirming the data captured by the input controller;

generate an audio message confirming the encrypted transfer instructions generated by the microprocessor;

wherein the microprocessor does not transmit the encrypted transfer instructions to the payment gateway until receiving an authorization input entered using the touch-sensitive screen.

16. The system of claim 15, wherein the audio message specifies the authorization input.

17. The system of claim 14, wherein the smart card further comprises a payment controller and the executable instructions when run by the microprocessor determine a network address of the payment gateway based on selection of the transfer option.

18. The system of claim 14 wherein the smart card is a first smart card associated with a first account, the system further comprising a second smart card associated with a second account, the second smart card configured to:

display a communication associated with the second smart card account on a touch-sensitive screen;

capture selection of an option to request a transfer from the first smart card;

transmit an instruction to the secure payment gateway to request a transfer from the first smart card.

* * * * *